United States Patent
Barlow et al.

(10) Patent No.: US 11,260,594 B2
(45) Date of Patent: Mar. 1, 2022

(54) STEREOLITHOGRAPHIC 3D PRINTER

(71) Applicant: PhotoCentriC Limited, Peterborough (GB)

(72) Inventors: Ed Barlow, Peterborough (GB); David O'Brien, Peterborough (GB); Paul Holt, Peterborough (GB)

(73) Assignee: PhotoCentriC Limited, Peterborough (GB)

( * ) Notice: Subject to any disclaimer, the term of this patent is extended or adjusted under 35 U.S.C. 154(b) by 81 days.

(21) Appl. No.: 16/410,588

(22) Filed: May 13, 2019

(65) Prior Publication Data
US 2019/0344504 A1 Nov. 14, 2019

(30) Foreign Application Priority Data
May 14, 2018 (GB) .................................... 1807823

(51) Int. Cl.
*B29C 64/264* (2017.01)
*B33Y 30/00* (2015.01)
*B33Y 50/02* (2015.01)
*B29C 64/393* (2017.01)

(52) U.S. Cl.
CPC .......... *B29C 64/264* (2017.08); *B29C 64/393* (2017.08); *B33Y 30/00* (2014.12); *B33Y 50/02* (2014.12)

(58) Field of Classification Search
CPC ... B29C 64/264; B29C 64/393; B29C 64/277; B29C 64/129; B29C 35/08; B33Y 30/00; B33Y 50/02; B33Y 10/00
See application file for complete search history.

(56) References Cited

U.S. PATENT DOCUMENTS

| 2002/0122642 | A1* | 9/2002 | Kijima | .................... H01L 51/52 |
| | | | | 385/120 |
| 2002/0164069 | A1 | 11/2002 | Nagano et al. | |
| 2004/0179088 | A1* | 9/2004 | Wong | .................. B41J 2/45 |
| | | | | 347/238 |

(Continued)

FOREIGN PATENT DOCUMENTS

| CN | 104890246 B | 4/2017 |
| CN | 206913680 U | 1/2018 |

(Continued)

OTHER PUBLICATIONS

UK Combined Search and Examination Report issued in counterpart GB Application No. GB1807823.8 dated Nov. 14, 2018 (seven (7) pages).

(Continued)

*Primary Examiner* — Leith S Shafi
*Assistant Examiner* — Inja Song
(74) *Attorney, Agent, or Firm* — E. Eric Mills; Nexsen Pruet, PLLC

(57) ABSTRACT

A 3D printer comprising: a vat for liquid photopolymer; a print platform for extending into the vat; a screen assembly have an arrangement of screens for providing an exposure of patterned electromagnetic radiation for selectively polymerising successive layers of photopolymer to build a 3D printed object on the print platform; and a control mechanism for controlling the separation of the print platform and screen assembly parallel to a build direction.

12 Claims, 4 Drawing Sheets

(56) References Cited

U.S. PATENT DOCUMENTS

| | | | | |
|---|---|---|---|---|
| 2013/0295215 A1* | 11/2013 | Wu | .................. | B29C 64/112 |
| | | | | 425/174.4 |
| 2015/0290876 A1* | 10/2015 | Liu | .................. | B33Y 30/00 |
| | | | | 264/401 |
| 2016/0297146 A1* | 10/2016 | Wu | .................. | B33Y 10/00 |
| 2017/0151717 A1* | 6/2017 | Li | .................. | B33Y 10/00 |
| 2018/0126630 A1 | 5/2018 | Panzer et al. | | |
| 2019/0200467 A1* | 6/2019 | Chin | .................. | G02F 1/13336 |

FOREIGN PATENT DOCUMENTS

| | | |
|---|---|---|
| JP | 4639322 B2 | 2/2011 |
| WO | 2016186574 A1 | 11/2016 |
| WO | 2018032531 A1 | 2/2018 |
| WO | 2018091891 A1 | 5/2018 |

OTHER PUBLICATIONS

UK Search Report issued in counterpart GB Application No. GB1902883.6 dated Aug. 14, 2019 (three (3) pages).

Extended European Search Report issued in counterpart EP Application No. 19174214.7 dated Oct. 28, 2019 (thirty-six (36) pages).

\* cited by examiner

STEREOLITHOGRAPHIC 3D PRINTER

CROSS-REFERENCE TO RELATED APPLICATIONS

The presently disclosed subject matter is related to and claims priority to European Patent Application No. 1807823.8 entitled "STEREOLITHOGRAPHIC 3D PRINTER" filed on May 14, 2018; the entire disclosure of which is incorporated herein by reference.

TECHNICAL FIELD

The present invention relates to stereolithographic 3D printing in which successive layers of liquid photopolymer are exposed to respective illumination patterns causing a pattern of polymerisation that builds up a 3D printed object.

BACKGROUND

It is known to form 3D printed objects by a stereolithographic printing process, in which successive layers of the printed object are formed by selective polymerisation of a liquid photopolymer (photosensitive polymer), the pattern of each layer of polymerisation resulting from exposure to a light of an appropriate wavelength from an LED screen (e.g. a television screen) or through a backlit LCD screen (e.g. a mobile telephone screen).

To form a large number of small 3D printed objects or large 3D printed objects, a large LED screen or backlit LCD screen may be used. However, commercially available large screens are typically manufactured for applications in which they are viewed from a greater distance (e.g. large television screens), and have a correspondingly reduced pixel density, limiting the resolution available when used for stereolithographic 3D printing.

US 2016/297146 A1 discloses an exposure device for a three-dimensional printer. The exposure device includes a single pixel panel (i.e. screen) including a plurality of pixel units. The printer of US 2016/297146 A1 is configured so as to be miniaturized in compared to known printers. In addition, light emitted from the pixel panel is configured to produce one single-layer structure. As such, the printer of US 2016/297146 A1 is configured specifically for the production of small, individual components and not for the simultaneous production of multiple components.

SUMMARY OF THE DISCLOSURE

According to a first aspect, there is provided a 3D printer comprising:
a vat for liquid photopolymer;
a print platform for extending into the vat;
a screen assembly having an arrangement of screens for providing an exposure of patterned electromagnetic radiation for selectively polymerising successive layers of photopolymer to build a 3D printed object on the print platform; and
a control mechanism for controlling the separation of the print platform and screen assembly parallel to a build direction.

Each screen may comprise a visual display screen and the printer may be provided with a light source for emitting electromagnetic radiation, which is patterned by selective transmission through the visual display screen.

Each screen may comprise an emissive pixel array for emitting the patterned electromagnetic radiation.

Each screen may comprise a pixel array surrounded by a border in which pixels are absent. In addition (or alternatively) when mounted in the screen assembly, there may be a gap between adjacent screens. Accordingly, there are gaps between the pixels arrays of adjacent screens, leaving corresponding gaps in the possible exposure of each layer of photopolymer from each pattern of exposure.

In deliberately setting the screens apart with a gap or border (such that there is a non-illuminated edge) the screen assembly is particularly suited to simultaneously building a separate structure on each screen (for example each separate structure may correspond to the same component, such that a plurality of the same component is produced simultaneously). The borders/gaps minimise 'exposure contamination' between the exposures of adjacent screens allowing for the production of more uniform components than is achievable when using a single large screen for the production of multiple components simultaneously.

In other words, when each screen comprises a pixel array surrounded by a border in which pixels are absent and/or a gap is provided between adjacent screens, the arrangement of screens is suitable for providing an exposure of patterned electromagnetic radiation for selectively polymerising successive layers of photopolymer to simultaneously build a plurality of 3D printed objects on the print platform.

The vat may have a vat base that is substantially transparent to light from the light source and the screen assembly may be configured for transmitting electromagnetic radiation through the vat base.

The control mechanism may be configured to control the relative position of the print platform and screen assembly perpendicular to the build direction, and
the control mechanism may be configured to provide a plurality of exposures of respectively patterned electromagnetic radiation for each layer of a printed 3D object, each exposure having a different relative position of the print platform and screen assembly perpendicular to the build direction.

Each screen may have a pixel pitch, and the control mechanism is configured to provide a plurality of exposures for each successive layer, having exposures with relative positions that differ by less than the pixel pitch.

An assembly of tapered fibre optic plates may be provided between pixel arrays of the screens and a vat base of the vat. The assembly of tapered fibre optic plates may have fibre optic plates that each have a bundle of optical fibres with a narrow end adjacent a respective screen and the narrow end may be narrower than a respective pixel array of each screen, and the control mechanism may be configured to selectively display pixels optically coupled into the fibre optical plate.

According to a second aspect, there is provided a 3D printer comprising:
a vat for liquid photopolymer;
a print platform for extending into the vat;
a screen for providing an exposure of patterned electromagnetic radiation for selectively polymerising successive layers of photopolymer to build a 3D printed object on the print platform;
a control mechanism for controlling the separation of the print platform and screen assembly parallel to a build direction;
wherein the control mechanism is configured to control the relative position of the print platform and the screen perpendicular to the build direction; and
the control mechanism is configured to provide a plurality of exposures of respectively patterned electromagnetic radiation for each layer, each exposure having a different relative position of the print platform and screen assembly perpendicular to the build direction.

The screen may comprise a visual display screen and the printer may be provided with a light source for emitting electromagnetic radiation, which is patterned by selective transmission through the visual display screen.

The screen may comprise an emissive pixel array for emitting the patterned electromagnetic radiation.

The vat may have a vat base that is substantially transparent to light from the light source and the screen assembly is configured for transmitting electromagnetic radiation through the vat base.

The screen may have a pixel pitch, and the control mechanism may be configured to provide a plurality of exposures for each successive layer, having exposures with relative positions that differ by less than the pixel pitch.

An assembly of tapered fibre optic plates may be provided between a pixel array of the screen and a vat base of the vat.

The tapered fibre optic plate may have a bundle of optical fibres with a narrow end adjacent the screen and the narrow end may be narrower than a pixel array of the screen, and the control mechanism may be configured to selectively display pixels optically coupled into the fibre optical plate.

DESCRIPTION OF THE DRAWINGS

Examples are further described hereinafter with reference to the accompanying drawings, in which.

DETAILED DESCRIPTION

In the described examples, like features have been identified with like numerals, albeit in some cases having one or more of: increments of integer multiples of 100; and suffix letters. For example, in different figures, 124, 224 and 424 have been used to indicate a print platform.

Figure 1:
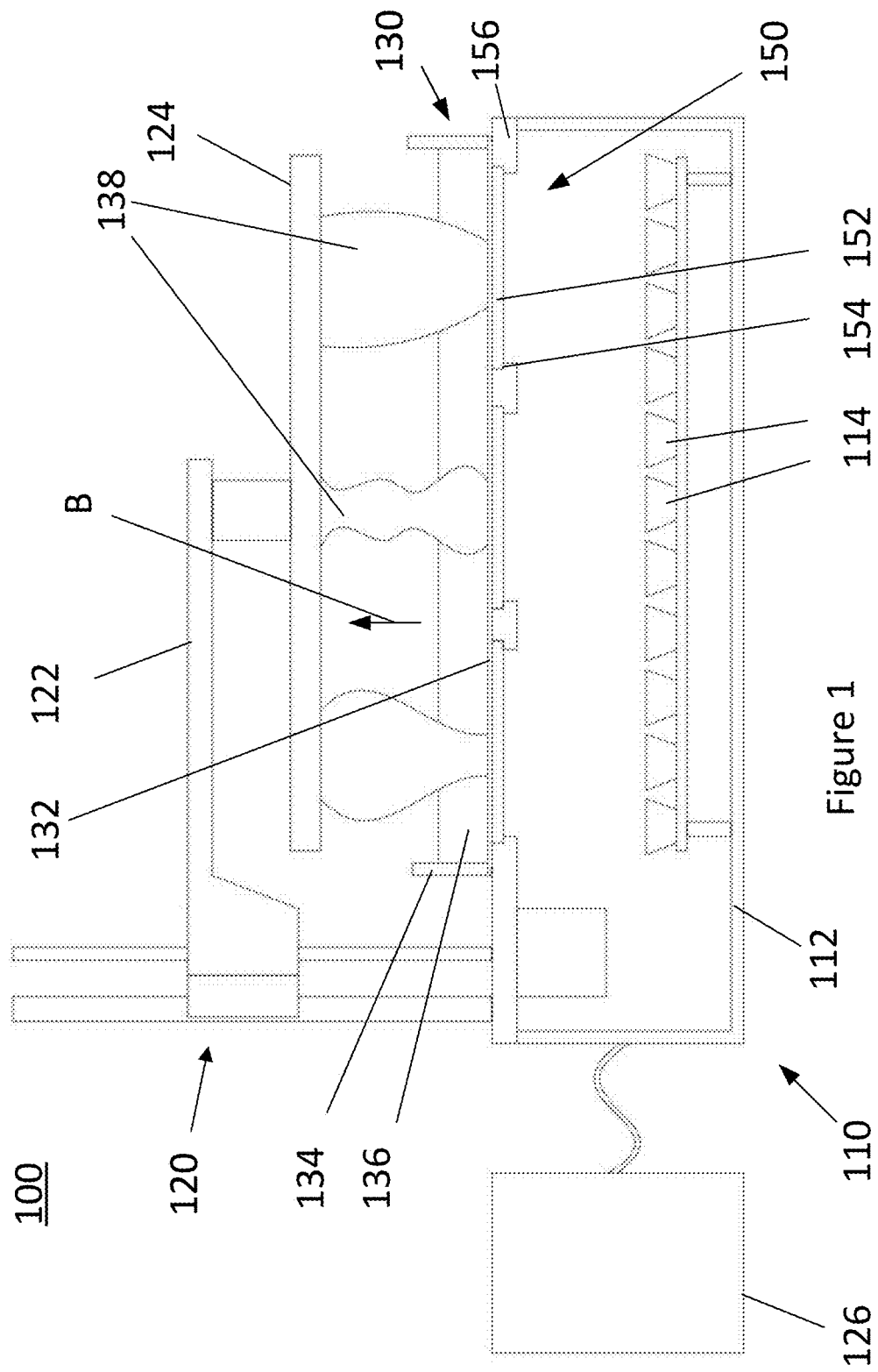
FIG. 1 shows a side view of a first stereolithographic 3D printer, in use printing a plurality of small 3D printed objects.

FIG. 1A shows a stereolithographic 3D printer (three-dimensional printer) 100. The printer 100 has a printer base 110, a height control mechanism 120 connected to the base, and a photopolymer vat 130 supported on the base.

The base 110 has a housing 112 supporting a screen assembly 150 above a light source 114 that emits electromagnetic radiation for polymerising photosensitive polymer, e.g. visible light or ultraviolet light. The light source 114 may be configured to emit electromagnetic radiation that is collimated or approximately collimated, and oriented substantially perpendicular to the screens 152 of the screen assembly 150.

The height control mechanism 120 has a motorised arm 122 supporting a print platform 124, on which a 3D printed object or objects is formed, in use, and a controller 126 for controlling the relative movement parallel to the build direction B of any of the print platform, the vat 130 and the screen assembly 150.

The vat 130 has a vat base 132 and walls 134. In use, the vat 130 is provided with a supply of liquid photopolymer 136.

The vat base 132 of the vat 130 has a high transmissivity of electromagnetic radiation at a wavelength at which the photopolymer 136 polymerises (e.g. it may be substantially transparent across a broad range of wavelengths).

The vat base 132 may be provided with a very low energy surface on the inner surface (facing the photopolymer 136, in use) to reduce adhesion of the 3D printed objects 138, in use. For example, the vat base 132 may be provided with a coating films of Polymethylpentene (PMP), Fluorinated Ethylene Propylene (FEP), Perfluroalkoxy (PFA), Ethylene Chlorotrifluoroethylene (ECTFE), Polyvinylidene Fluoride (PVDF), Polypropylene (PP), or polyester (PET). These films may be provided onto a substrate as monofilms or co-extrusions or laminates. Alternatively, the vat base 132 may comprise a substrate that is surface treated to reduce the surface energy, for example being treated with silanes, silicones, silsesquioxanes or the like. For example, the vat base may comprise a substrate of thin sheet glass provides with a surface coating of silicone, e.g. Polydimethylsiloxane (PDMS), for example Sylgard® 184 manufactured by Dow Chemical company.

The light source 114 emits electromagnetic radiation for polymerising the photopolymer 136 (e.g. it may emit a broad wavelength range including the wavelength(s) at which the photopolymer polymerises).

The screen assembly 150 has a plurality of screens 152 received into respective alignment recesses 154 of a screen support plate 156.

In the illustrated 3D printer 100, the screens are liquid crystal display (LCD) screens 152, each containing an array of pixels, each of which has a controllable optical transmissivity at a wavelength(s) at which the photopolymer polymerises, e.g. each pixel has a transmissivity that may be selectively controlled to be substantially transparent and substantially opaque, and may additionally be set to one or more intermediate levels of transmissivity. In the illustrated LCD screens 152, the pixels in each screen are arranged in an array with a 47 µm pixel pitch in each of the x- and y-directions. In use, the LCD screens 152 are backlit by the electromagnetic radiation emitted by the light source 114, and pattern the light that is transmitted to the vat base 132 in accordance with the pattern of transmissivity displayed on the screens by the controller 126. Alternatively, backlighting may be built into the LCD screens. In a further alternative, the screens may be selectively light emitting, for example being light emitting diode (LED) screens, each comprising an array of pixels, each of which has a controllable optical emission at the wavelength(s) at which the photopolymer polymerises. For example, the LED screens may be organic light-emitting diode (OLED) screens, which may have a high pixel density.

The illustrated screens 152 are (non-emissive) visual display screens for use with backlighting, e.g. a separate light source 114, or backlighting that is built-into the screens. Alternatively, the screens may be emissive pixel array screens.

The visual display screens or emissive pixel array screens may be of the following types: Liquid Crystal Display (LCD), Light emitting Diode (LED), Electronic paper (E Ink), Electroluminescent display (ELD), Plasma Display Panel (PDP) or Organic Light-emitting Diode Display (OLED). In the illustrated printer 100, a plurality of light sources is shown, each of which may be separately collimated (having an emission angle of less than 15 degrees. Alternatively, a single light source may be used. A lens may be provided for collimating the or each light source, e.g. a Fresnel lens or an array of generally lenticular lenses.

In the illustrated 3D printer 100, the plurality of screens 152 is an orthogonal two-dimensional array of screens. Alternatively, the plurality of screens may be a one-dimensional array of screens. The plurality of screens may be tessellated in rows with an offset between successive rows (e.g. each row is offset by half a screen width or length, in a similar manner to "header bond" brickwork). The plurality of screens may be arranged in a spiral pattern or pattern of concentric rings.

In the illustrated 3D printer 100, the motorised arm 122 is adapted to raise and lower the print platform 124 relative to the vat base 132 of the vat 130 (parallel to the build direction B, perpendicular to the horizontal surface of the liquid photopolymer in the vat, in use), under the control of the controller 126. Alternatively, or additionally, the base may be configured to lower and raise the base relative to the print platform. By either, or both, approaches, the relative separation (i.e. in the z-plane, perpendicular to the build surface of the build platform) between the face of the print platform 124 and the vat base 132 of the vat 130 may be controllably varied in response to control signals from the controller 126.

In use, a supply of liquid photopolymer (photosensitive polymer) 136 is provided in the vat 130. The print platform 124 is positioned close to, and parallel with, the vat base 132, e.g. the print platform is spaced apart from the vat base by less than 100 μm, e.g. 50 μm. The layer of liquid photopolymer 136 between the print platform and the vat base 132 is exposed to a pattern of illumination provided by the screens 152 and light source 114, with the screens being controlled by the controller 126 to provide an opaque silhouette corresponding to the required exposure pattern, in optical negative. Patterned photopolymerisation occurs in the layer of photopolymer adjacent the vat base, corresponding with the exposure pattern. The print platform is then moved to a new position (e.g. raised) in which it is separated from the vat base by the thickness of a further layer, and the corresponding further layer of liquid photopolymer is exposed to a respective pattern of exposure from the screens and light source. This process is then repeated, to build up the successive layers of the required 3D printed object(s).

Although described in relation to a backlit (non-emissive) visual display screen that displays a silhouette, it will be appreciated that a corresponding 3D printing process may alternatively be provide by emissive pixel array screens that display a pattern of illumination (e.g. the optical positive of the exposure pattern, being the optical negative of the silhouette).

The use of a screen assembly 150 having multiple screens 152 enables one or more separate 3D printed objects to be built simultaneously corresponding to the exposure pattern from each screen, increasing throughput of a single 3D printer, reducing expenditure costs, whilst maintaining a high resolution in the 3D printed object. The use of a multi-screen arrangement reduces photopolymer waste, from residue left on the vat walls 134. The 3D printed objects may the same or different. For example, a plurality of individually bespoke dental arches may be simultaneously printed.

In the illustrated 3D printer, the vat base is illuminated with a patterned exposure from below, forming the 3D printed object on the underside of a print platform, as the print platform rises away from the vat base. However, alternatively, the print platform may be submerged in a vat of photopolymer, and through successive exposures a 3D printed object may be built on the print platform (e.g. the print platform may be horizontal with the 3D printed object formed on the upper surface).

The photopolymer 136 can be of any type that will harden with light of the intensity and wavelength of the light source. It can be acrylate, epoxy based or another form of chemistry. It can be free radically cured in small format printers or more may be cationically cured in larger format printers. The unreacted liquid photopolymer that remains in the vat after the 3D printed object has been made can be re-used. After printing, the 3D printed object is drained and washed in a solvent, e.g. alcohol, e.g. IPA, or detergent and water. After cleaning, a post processing procedure involving blanket illumination of light and optionally heat is provided to fully harden the object and leave it dry to touch.

Figure 2A:
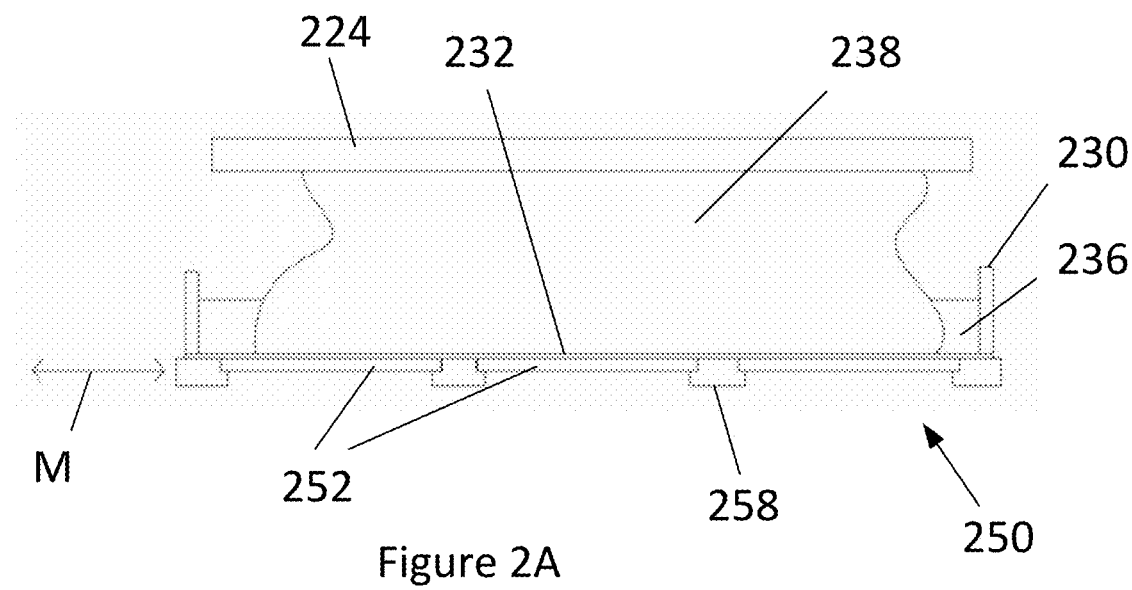
FIG. 2A shows a side view of part of a second stereolithographic 3D printer, in use, printing a large 3D printed object.
Figure 4:
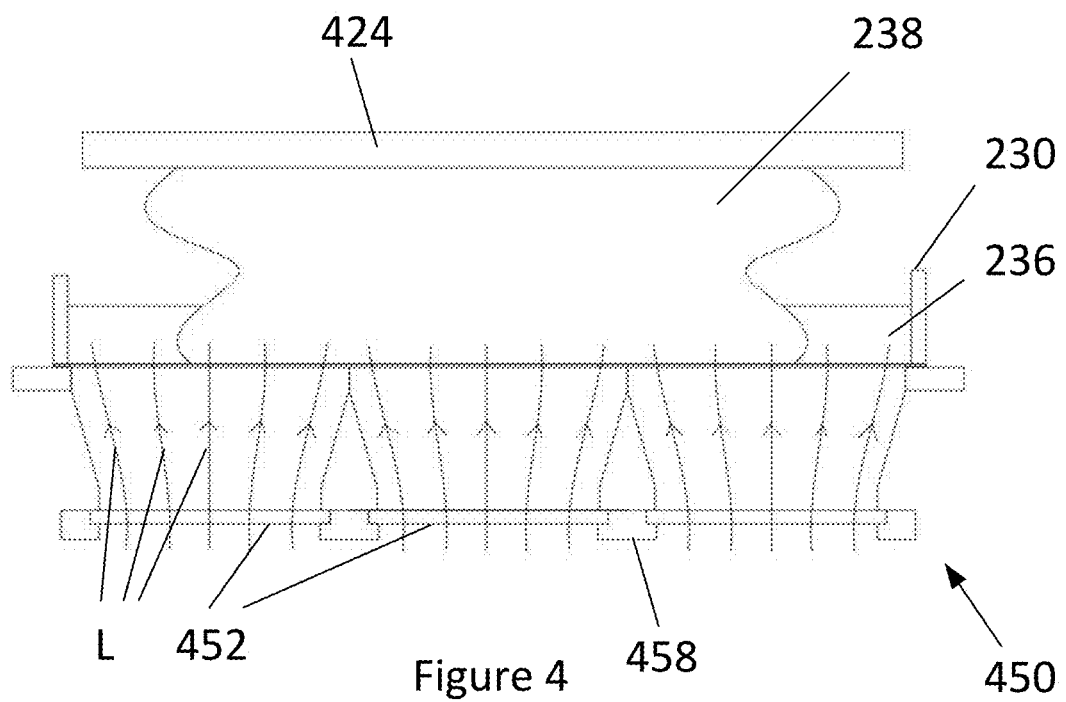
FIG. 4 shows a side view of part of a fourth stereolithographic 3D printer, in use printing a large 3D printed object.

In the illustrated 3D printer 200, the base is additionally adapted to move M the vat 230 laterally (substantially parallel to the horizontal surface of the liquid photopolymer in the vat, in use) relative to the print platform 224, as shown in FIG. 2A. The relative lateral movement may be provided by lateral movement of the vat 230, lateral movement of the print platform 224, or a combination of both movements. The relative lateral orientations of the print platform 224 and the vat base 232 of the vat 230 may be controllably varied in response to control signals from the controller 226. The relative lateral movement may be in one dimension (e.g. x-direction only) or may be in two dimensions (i.e. movement in the x-y plane, perpendicular to the z-direction movement discussed above). In the case of two-dimensional relative lateral movement, perpendicular movements may be respectively provided by movement of the base and print platform. For example, the motorised arm 222 may be adapted to move the print platform 224 in the x-direction, and the printer base 210 may be adapted to move the vat 230 in the perpendicular y-direction.

Each screen 252 has a pixel array surrounded by a border in which pixels are absent. Further, when mounted in the screen assembly 250, there may be a gap 258 between adjacent screens 152, as shown in FIG. 1A. Accordingly, there are gaps between the pixel arrays of adjacent screens, leaving corresponding gaps in the possible exposure of each layer of photopolymer from each pattern of exposure.

In use, each layer of the 3D printed objects may be built up by a group of two or more exposures (e.g. three exposures) from the screens 252, in which relative lateral movement of the print platform 224 and vat base 232 occurs between the exposures of the group. Gaps in the exposure pattern from a first exposure, due to gaps between the pixel arrays of adjacent screens, may be filled-in by one or more further exposures after a relative lateral offset between the vat base 232 or print platform 224 (or both). Accordingly, by the use of two or more exposures from the screens, with intervening relative lateral movement between the vat base 232 and the print platform 224, a 3D printed layer may be formed that extends across more than the width, length or width and length, of a single screen. For example, a 3D printed layer may be formed that is similar in size to the arrangement of pixel arrays in the screen assembly 250.

Further, by the use of relative lateral movement between the vat base 232 and print platform 224, between successive exposures in a group that build up a composite exposure pattern for a single layer of 3D printing, the pixel arrays of adjacent screens 252 may be spaced apart by substantially sized gaps, e.g. gaps that are more than half the size of the pixel arrays, and only slightly smaller than the corresponding size of the pixel arrays.

In the case that each screen is an emissive pixel array, commonly each pixel is compound, having red, green and blue sub-pixels, and only one sub-pixel (e.g. blue) from each compound pixel being used for polymerising the photopolymer. Relative lateral movement may be provided by less than the pixel pitch to form a composite exposure, by which the sub-pixels of the chosen colour are subject to a relative offset by less than the pixel pitch, to fill-in the gaps between the operational sub-pixels, and so increase resolution. For example, the pixel pitch may be 47 µm, with each sub-pixel having a width of 8-10 µm, and four different relative offsets may be used that are spaced apart by less than one pixel pitch. This filling-in of gaps between sub-pixels may be combined with larger lateral relative movements to fill-in gaps between pixel arrays.

Figure 2B:
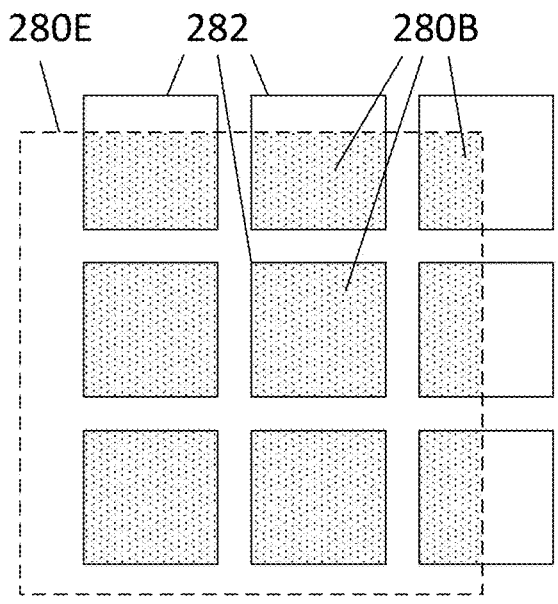
FIGS. 2B to 2D show successive exposures of pixel arrays of screens that are stitched together to form the composite exposure of FIG. 2E.
Figure 2C:
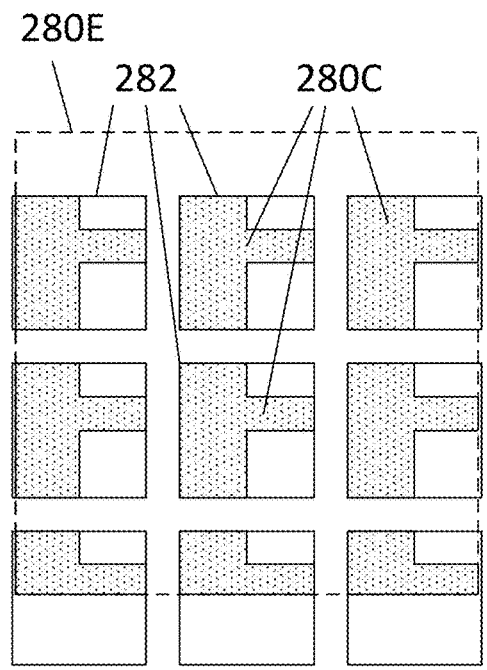
Figure 2D:
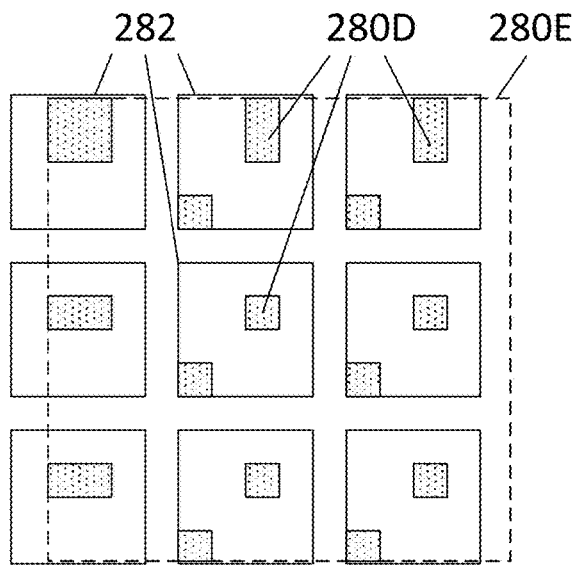
Figure 2E:
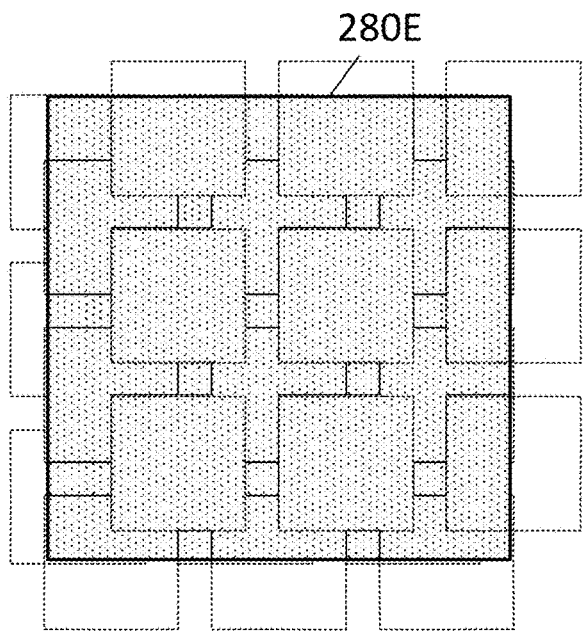

The illustrated 3D printer 200 has a two-dimensional array of print screens 252, for example a 3×3 array of screens. FIGS. 2B to 2D show successive exposures (patterns of illumination) 280B-280D from the pixel arrays 282 that form a composite exposure pattern 280E, shown in FIG. 2E, for exposing a single layer of photopolymer to provide a single layer of a 3D printed object. The outline of the composite exposure pattern 280E is indicated in FIGS. 2B to 2D to show the relative positioning of the pixel arrays of the screens, relative to the position of the print platform. By the use of three exposures 280B-280D, a composite exposure 280E for each layer of the 3D printed object may be formed, which is almost as large as the outer periphery of the assembly of pixel arrays of the screens 252. For the purposes of illustration, the composite exposure is shown with full illumination across the whole area, although typically the composite exposure will be patterned.

Alternatively, four exposures may be used for forming the composite exposure for each layer of the 3D printed object, for example with screens arranged with more widely separated pixel arrays (and each of those exposures may be a combination of exposures to provide sub-pixel level in-filling).

By use of a composite exposure for each layer of printing, a 3D printed object 238 may be printed that is as wide, as long, or both as wide and as long as the composite exposure, as shown in FIG. 2A.

Although the 3D printer has been illustrated with a two-dimensional array of screens, the 3D printer may alternatively have only a one-dimensional array of screens, with each composite exposure for each 3D printed layer being formed by relative lateral movements in only one direction (e.g. x-direction). Substantial relative movement may be provided only along the length of the one-dimensional array, with two offset exposures forming a longer composite exposure. Alternatively, the one-dimensional array may also be offset with relative movement perpendicular to the length of the one-dimensional array. Again, each of the exposures may be a combination of exposures to provide sub-pixel in-filling.

Figure 3:
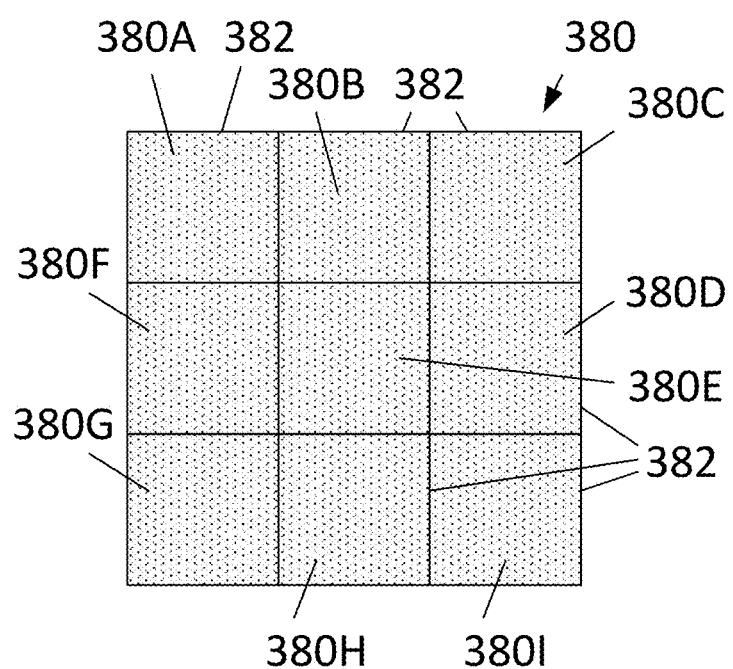
FIG. 3 shows successive exposures of pixel arrays of screens that are stitched together for form a composite exposure.

In a further alternative, the 3D printer may have only a single screen 382, with a composite exposure 380 for each 3D printed layer being formed by relative lateral movements of the pixel array of a single screen to positions 380A-380I, as shown in FIG. 3. A small overlap may additionally be provided between adjacent exposures. Again, each of the exposures may be a combination of exposures to provide sub-pixel in-filling.

Provision of an area of photopolymer over which a patterned exposure is provided may be made broadened by the provision of an optically tapered fibre optic plate (FOP) between the pixel array(s) of the screen(s) and the vat base.

The tapered FOP is formed from a bundle of optical fibres with polished ends, each of which is tapered (e.g. each optical fibre tapers from 6 µm at the bottom to 7 µm at the top). The tapered optical fibres are bundled to form fans of optical fibres extending from a narrow end adjacent the screens 452 to a wider end adjacent the vat base 432, so that light L from the pixel array(s) of the screen(s) is spread to a larger area at the vat base than at the screen.

For use with a plurality of screens, a corresponding plurality of tapered FOPs is provided in an FOP assembly, with an FOP aligned with each screen. The images received from each screen's pixel array create a single larger image on the opposite surface of the corresponding FOP. The wider ends of the FOPs are arranged without a gap between them. Accordingly, when used with a plurality of separate screens, by expanding the images from the screens, a continuous exposure may be stitched together using images from spatially separated pixel array on the plurality of screens, e.g. the FOP assembly may be used to fill-in the gaps between the pixel arrays of adjacent screens.

The narrow ends of the FOPs may be narrower than the pixel arrays of the screens, and the pixels that align with the narrow ends of the pixel arrays may be electrically selected during a calibration procedure. This may reduce manufacturing tolerances, and so reduce the cost of the FOP assembly.

The exposure area may be further broadened by the provision of relative lateral movement of the vat base relative to the arrangement of the FOP assembly and screen (s).

The 3D printers discussed above may be used for printing dental arches or shoe mid-soles.

Each 3D printed object is washed and subject to further illumination to further polymerise the 3D printed object.

The figures provided herein are schematic and not to scale.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A 3D printer comprising:
a vat for liquid photopolymer;
a print platform for extending into the vat;
a screen assembly having an arrangement of screens for providing an exposure of patterned electromagnetic radiation for selectively polymerising successive layers of photopolymer to build a 3D printed object on the print platform,
wherein each screen comprises an emissive pixel array for emitting the patterned electromagnetic radiation,
wherein the emissive pixel array comprises at least 2-by-2 pixels, and
wherein adjacent screens of the screen assembly are separated by a gap in which pixels are absent, and the gap between the adjacent screens is more than half the width or length of the screens; and
a control mechanism for controlling the separation of the print platform and the screen assembly parallel to a build direction;
wherein the control mechanism is configured to control the relative position of the print platform and the screen assembly perpendicular to the build direction; and
wherein the control mechanism is configured to provide a plurality of exposures of respectively patterned electromagnetic radiation for each layer, each exposure having a different relative position of the print platform and the screen assembly perpendicular to the build direction.

2. The 3D printer of claim 1, wherein each screen comprises a visual display screen and the printer is provided with a light source for emitting the patterned electromagnetic radiation, which is patterned by selective transmission through the visual display screen.

3. The 3D printer of claim 1, wherein the vat has a vat base that is substantially transparent to the electromagnetic radiation and the screen assembly is configured for providing the patterned electromagnetic radiation to the vat base.

4. The 3D printer of claim 1, wherein each screen has a pixel pitch, and the control mechanism is configured to provide a plurality of exposures for each successive layer, having exposures with relative positions that differ by less than the pixel pitch.

5. The 3D printer of claim 1, wherein an assembly of tapered fibre optic plates is provided between the pixel arrays of the screens and a vat base of the vat.

6. The 3D printer of claim 5, wherein each of the tapered fibre optic plates has a bundle of optical fibres with a narrower end adjacent a respective screen of the screen assembly and a wider end adjacent the vat base, and the control mechanism is configured to selectively display pixels optically coupled into the fibre optical plate.

7. A 3D printer comprising:
a vat for liquid photopolymer;
a print platform for extending into the vat;
a screen assembly having an arrangement of screens for providing an exposure of patterned electromagnetic radiation for selectively polymerising successive layers of photopolymer to build a 3D printed object on the print platform,
wherein each screen comprises an emissive pixel array for emitting the patterned electromagnetic radiation,
wherein the emissive pixel array comprises at least 2-by-2 pixels, and
wherein each screen comprises a border in which pixels are absent surrounding the corresponding pixel array, wherein a gap between the pixel arrays of adjacent screens provided by the borders of the adjacent screens is more than half the width or length of the pixel arrays; and
a control mechanism for controlling the separation of the print platform and the screen assembly parallel to a build direction;
wherein the control mechanism is configured to control the relative position of the print platform and the screen assembly perpendicular to the build direction; and
wherein the control mechanism is configured to provide a plurality of exposures of respectively patterned electromagnetic radiation for each layer, each exposure having a different relative position of the print platform and the screen assembly perpendicular to the build direction.

8. The 3D printer of claim 7, wherein each screen comprises a visual display screen and the printer is provided with a light source for emitting the patterned electromagnetic radiation, which is patterned by selective transmission through the visual display screen.

9. The 3D printer of claim 7, wherein the vat has a vat base that is substantially transparent to the electromagnetic radiation and the screen assembly is configured for providing the patterned electromagnetic radiation to the vat base.

10. The 3D printer of claim 7, wherein each screen has a pixel pitch, and the control mechanism is configured to provide a plurality of exposures for each successive layer, having exposures with relative positions that differ by less than the pixel pitch.

11. The 3D printer of claim 7, wherein an assembly of tapered fibre optic plates is provided between the pixel arrays of the screens and a vat base of the vat.

12. The 3D printer of claim 11, wherein each of the tapered fibre optic plates has a bundle of optical fibres with a narrower end adjacent a respective screen of the screen assembly and a wider end adjacent the vat base, and the control mechanism is configured to selectively display pixels optically coupled into the fibre optical plate.

* * * * *